United States Patent [19]

Krolak et al.

[11] 4,220,391

[45] Sep. 2, 1980

[54] CONNECTOR ADAPTER CONSTRUCTIONS WITH IMPROVED CONNECTOR AND CONNECTOR MOUNTING ARRANGEMENT

[75] Inventors: Ronald F. Krolak, North Riverside; Frederick J. Radloff, Northlake, both of Ill.

[73] Assignee: Bunker Ramo Corporation, Oak Brook, Ill.

[21] Appl. No.: 880,671

[22] Filed: Feb. 23, 1978

Related U.S. Application Data

[62] Division of Ser. No. 770,805, Feb. 22, 1977, Pat. No. 4,103,985.

[51] Int. Cl.² .......... H02G 1/08; H04M 9/00

[52] U.S. Cl. .......... 339/126 R; 179/1 PC; 339/128; 339/176 M

[58] Field of Search .......... 339/91 R, 125-128, 339/176 M; 248/27.3; 179/96, 1 PC

[56] References Cited

U.S. PATENT DOCUMENTS

| | | | |
|---|---|---|---|
| 2,535,031 | 12/1950 | Beatty | 173/328 |
| 3,015,083 | 12/1961 | Juris | 339/176 |
| 3,083,345 | 3/1963 | Scheller | 339/47 |
| 3,137,535 | 6/1964 | Collier et al. | 339/91 R X |
| 3,366,729 | 1/1968 | Pauza | 339/91 R |
| 3,376,592 | 4/1968 | Ulaminer | 339/125 |
| 3,387,253 | 6/1968 | Salners | 339/102 |
| 3,399,374 | 8/1968 | Pauza et al. | 339/91 R |
| 3,475,718 | 10/1969 | Hartz et al. | 339/91 R |
| 3,651,446 | 3/1972 | Sadogierski et al. | 339/91 R |
| 3,660,802 | 5/1972 | Staudt | 339/126 RS |
| 3,705,377 | 12/1972 | Hansen et al. | 339/121 |
| 3,778,750 | 12/1973 | Caveney et al. | 339/125 R |
| 3,824,552 | 7/1974 | Kirby | 339/128 |
| 3,850,497 | 11/1974 | Krumreich et al. | 339/126 R |
| 3,936,129 | 2/1976 | Guy | 339/103 R |
| 3,950,060 | 4/1976 | Stipanur et al. | 339/91 R |
| 3,951,501 | 4/1976 | Bauerle et al. | 339/91 R |
| 3,989,343 | 11/1976 | Lucius | 339/128 |
| 3,990,763 | 11/1976 | Kress | 339/155 R |
| 3,990,764 | 11/1976 | Krumreich | 339/176 M |
| 4,046,449 | 9/1977 | Ranzanigo | 339/91 A X |
| 4,070,548 | 1/1978 | Kasper | 179/1 PC |
| 4,089,579 | 5/1978 | Steinbach | 339/91 R |

FOREIGN PATENT DOCUMENTS

| | | |
|---|---|---|
| 1316367 | 12/1962 | France . |
| 1594904 | 7/1970 | France . |
| 2254175 | 7/1975 | France . |
| 2276714 | 1/1976 | France . |
| 362134 | 7/1962 | Switzerland . |
| 1211057 | 11/1970 | United Kingdom . |

OTHER PUBLICATIONS

The Modular Telephone, AR. Meier, Telephony Magazine, 11/25/74, pp. 27-33.

*Primary Examiner*—Roy Lake
*Assistant Examiner*—Eugene F. Desmond
*Attorney, Agent, or Firm*—F. M. Arbuckle; T. J. Haller

[57] ABSTRACT

Modular connectors and associated adapter assemblies are disclosed for interconnecting telephones and telephone signal equipment. The modular connector and a mounting plate are structured so that the connector sidewalls with integral bosses and/or the apertured mounting plate are resiliently deformable to permit simple insertion and snap-locking of the connector and mounting plate.

Various adapter configurations utilizing one or more modular connectors in unique system arrays for interconnection to non-mating signal equipment are also disclosed.

29 Claims, 13 Drawing Figures

CONNECTOR ADAPTER CONSTRUCTIONS WITH IMPROVED CONNECTOR AND CONNECTOR MOUNTING ARRANGEMENT

This is a divisional application of application Ser. No. 770,805, filed Feb. 22, 1977, now U.S. Pat. No. 4,103,985, issued Aug. 1, 1978.

BACKGROUND OF THE INVENTION

The present invention is directed generally to electrical connectors and, more particularly, to improved modular connectors and associated bridging adapter assemblies which may be, for example, advantageously applied in the interconnection of individual telephone receivers to telephone system equipment.

Historically, telephone installation and repair has required the services of a skilled telephone technician who has been called upon to perform a customized on-site wiring, splicing, and assembly, as well as an all too frequent interconnection of non-mating components through the exercise of a personal ingenuity. Moreover, the proliferation of different species of telephone connector hardware has required that technicians be familiar with the peculiarities and wiring requirements for a maze of adapters and connectors and that the telephone companies maintain correspondingly large part inventories. In an attempt to reduce rising labor and part inventory costs, the telephone companies have focused considerable emphasis on the development of standardized or modularized telephone cables, connectors and associated adapters so that installations may more readily be made by a less skilled technician and in some cases by the customer himself.

One form of modular connector that has been developed in response to this need is disclosed in U.S. Pat. No. 3,850,497. A discussion of this connector, its commercial applications and the problems that remain for the industry in the further development and implementation of modular connectors and associated adapters to interface with existing equipment which will remain in the field for years to come is provided in an article entitled "The Modular Telephone—a Money-Saving Idea Whose Time Has Come", Telephony, Nov. 25, 1974, pp. 27-33.

Preferably, modular connectors to achieve the goals intended should be capable of easy installation and replacement coupled with reliable operation. Furthermore, the modular connectors and their associated adapters must be creatively designed to provide a wide ranging flexibility in the interfacing with existing telephone system equipment, as well as a suitability for new installations, while retaining simplicity in installation and a relatively modest initial manufacturing cost.

SUMMARY OF THE INVENTION

The present invention is directed to a modular connector which meets the aforementioned requirements, and to novel adapter assemblies which allow the novel modular connector to be utilized in a wide variety of system applications.

It is therefore a basic objective of the present invention to provide a new and improved modular connector and associated adapter assemblies incorporating one or more of said modular connectors in unique arrays that facilitate a simplified and highly flexible interconnection to varied configurations of telephone system equipment.

It is a further object of the present invention to provide a modular connector which is snap-locked in place in an apertured mounting plate without additional hardware or the need for hand tools.

It is another object of the present invention to provide new and improved, standardized connector and adapter assemblies for connecting individual telephone instruments to a telephone system, which assemblies are less costly to manufacture and more conveniently installed by less skilled technicians than prior art connector assemblies.

The invention provides a modular electrical connector of the type which is mounted in a bulkhead aperture, the connector including a housing defining a cavity for receiving a mating electrical connector and having at least one sidewall defining a forward portion having exterior dimensions substantially corresponding to the dimensions of the aperture, an outwardly projecting shoulder portion for limiting the insertion of the forward portion in the aperture, a boss projecting outwardly from the sidewall and being axially forwardly spaced relative to the shoulder portion, and the sidewall being inwardly deformable. As a result, the forward portion can be inserted into the aperture and locked in place upon reformation of the sidewall.

The invention further provides adapter assemblies incorporating the modular connector for connecting selected conductors of one or more second multi-conductor cables. Basically, the adapter assemblies of the invention comprise an enclosure having a plurality of walls and a multiple contact means within the enclosure having a first predetermined plurality of contacts adapted to be coupled to the conductors of the first multi-conductor cable. The assembly further includes a plurality of connecting members within the enclosure arranged in a predetermined pattern relative to the multiple contact means, each connecting member including a second plurality of contacts. The contacts of each connecting member coupled to selected contacts of the multiple contact means and arranged to be coupled to the conductors of one of the second multi-conductor cables.

BRIEF DESCRIPTION OF THE DRAWINGS

The features of the present invention which are believed to be novel are set forth with particularly in the appended claims. The invention, together with further objects and advantages thereof, may best be understood by reference to the following description in conjunction with the accompanying drawings and in which:

FIG. 1 is a top plan view partly broken away of an assembled modular connector and connector mounting plate embodying the present invention, while

DESCRIPTION OF THE PREFERRED EMBODIMENT

Figure 1:
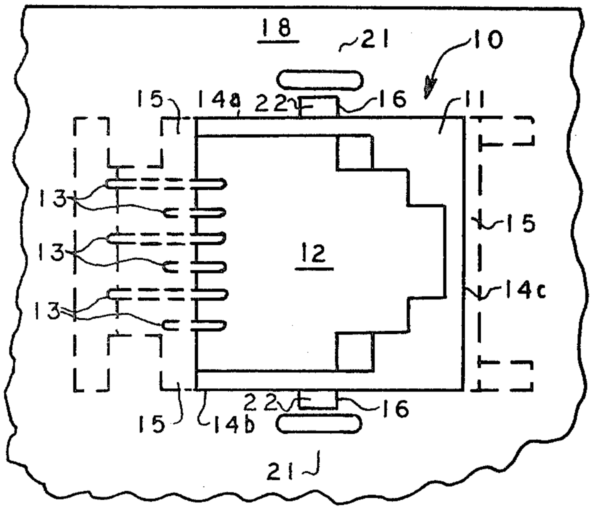
Figure 2:
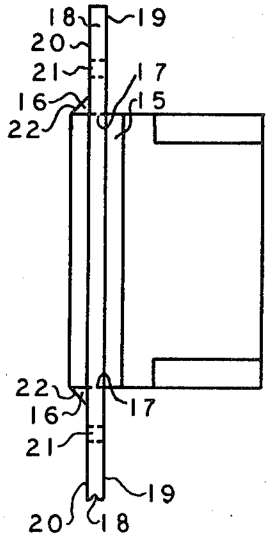
FIG. 2 is an end plan view of the connector and connector mounting arrangement of FIG. 1.
Figure 3:
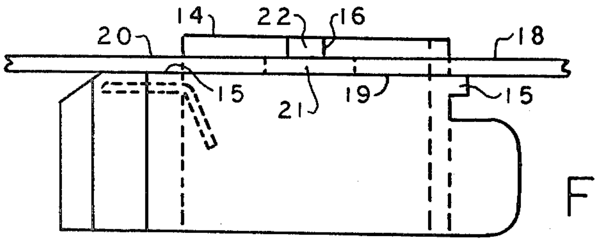
FIG. 3 is a side plan view of the connector and connector mounting arrangement of FIG. 1.

Referring now to the figures, and particularly to FIGS. 1 through 3, a modular electrical connector 10 constructed in accordance with the present invention comprises a generally rectangular dielectric body portion 11 preferably structured as an integrally molded plastic unit to form a central cavity 12 into which project the first end portions of a plurality of electrical contacts 13. The contacts 13 are external to cavity 12 at their opposite ends and are adapted for connection to telephone signal equipment in a manner to be hereinafter described. The portions of contacts 13 extending within cavity 12 make electrical contact with the corresponding contacts of a conventional mating electrical connector plug (not shown) which is complementary to connector 10 and adapted to be received by cavity 12. Modular connectors of the general type shown in FIGS. 1 through 3, excepting for the snap-lock mounting features of the present invention, are well known in the art, one form of such a modular connector and its mating plugs being disclosed in the aforementioned U.S. Pat. No. 3,850,497.

The body 11 of the modular connector includes a pair of resilient, inwardly deformable sidewalls 14*a*, 14*b* and an end wall 14*c*. The uppermost portions of the sidewalls and end walls 14*a–c* visible in FIG. 1 define a forward portion of the modular connector that projects into and part way through a suitably dimensioned aperture 17 of a support plate or bulkhead 18. Similar shoulder portions 15 and bosses 16 vertically spaced by a distance corresponding to the thickness of the bulkhead 18 are preferably integrally formed with each of the opposed sidewalls 14*a*, 14*b* at approximately the midpoint of their length for reasons presently to be explained.

The outside dimensions of the forward portion of the connector substantially corresponds to the dimension of the rectangular aperture 17. The shoulder portions 15 project outwardly from the forward portion 14 to form abutments to limit insertion of the forward portion of the connector into aperture 17. As a result, when the forward portion 14 is inserted into aperture 17, as shown in progress in FIG. 1(a) the bosses 16 are forced through the aperture so that the shoulder portions 15 abut the bottom surface 19 of the support 18 as shown most clearly in FIGS. 1 and 3. The shoulder portion 15 and the bosses 16 cooperate to define a locking means on connector 10 to snap-lock the connector in place with insertion of the forward portion 14 into aperture 17.

Figure 1A:
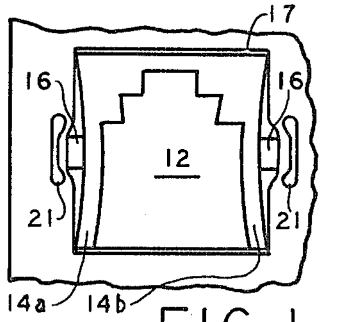
FIG. 1(a) is a detail of FIG. 1 illustrating the modular connector being inserted through the mounting plate in assembly of these components.

More specifically, the bosses 16 extend laterally of the forward portion of the sidewalls 14*a*, 14*b* to define at their lead edge a ramp or cam surface 22 that may be forcibly inserted through aperture 17 as shown in FIG. 1(a). The underside of the bosses 16 form a planar surface parallel to the shoulders 15 and spaced therefrom by the thickness of the bulkhead 18 thereby to insure a secure captivation of the mounting plate between the shoulders 15 and bosses 16. Support 18 may include relief means adjacent aperture 17 in the form of relief slots 21. The bosses 16 and relief slots 21 are arranged to be adjacent so that as the forward portion 14 of the connector is inserted into the aperture, the bosses and relief slots cooperate to permit a resilient deformation of the connector sidewalls and/or the lateral sidewalls defining the aperture 17. While it is preferable that both the forward portions of the sidewalls 14*a*, 14*b* and the apertured mounting plate be resiliently deformable, this is not absolutely necessary. Successful operation may be achieved without departing from the invention as long as either the connector forward portion sidewalls or the aperture sidewalls are deformable to a sufficient extent to permit a reliable snap-lock insertion of the connector into the bulkhead plate 18 without either incurring permanent damage.

As a result of this unique construction, when a modular connector 10 is to be locked in place within aperture 17 of bulkhead 18, the forward portion of the sidewalls and end wall 14*a–c* need only be inserted into the aperture until the bosses 16 clear the aperture to permit the shoulder portions 15 to abut the bottom surfaces 19 of the bulkhead. In this manner, the connector is snap-locked in place within the aperture of the support, and no additional support structure is required for mounting the connector in place. Thus, the manufacturing cost of adapter assemblies utilizing the connector of the present invention is minimized, as is the labor associated with installation.

Figure 4:
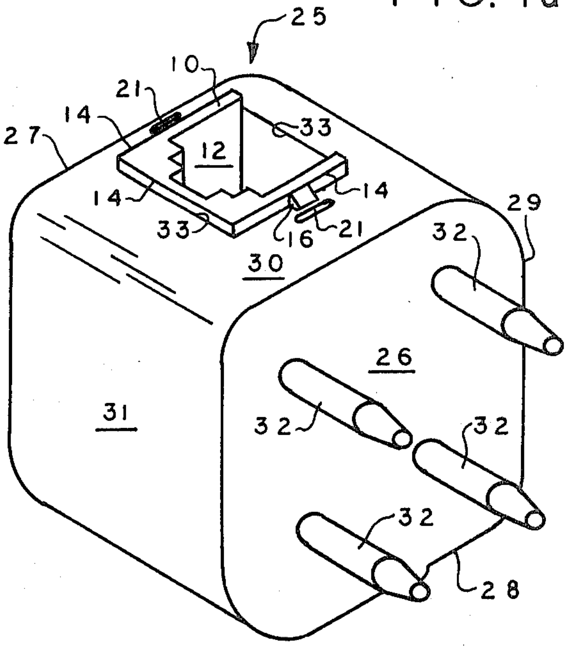
FIG. 4 is a perspective view of one embodiment of an adapter assembly including the novel modular connector of FIGS. 1-3 and embodying the features of the present invention.

FIG. 4 shows an adapter assembly connector 25 embodying the present invention which utilizes the snap-lock modulator connector 10 of FIGS. 1 through 3. The adapter-connector 25 of FIG. 4 is intended for connecting or adapting a standardized or modular cable from a telephone receiver to a conventional four-conductor telephone extention jack of the type manufactured by Western Electric and now in common use in homes for connection of portable extension telephones. The adapter-connector comprises an enclosure having a plurality of walls, namely front wall 27, a back wall 26, and sidewalls 28, 29, 30 and 31. The adapter-connector 25 also includes a plurality of pins 32, here four in number, which extend from back wall 26 and which are arranged for mating with a like plurality of female contacts of a telephone wall jack. Top sidewall 30 constitutes a connector mounting plate with an aperture 33 which is dimensioned for receiving the forward portion 14*a-c* of connector 10. The contacts 13 (FIG. 1) of connector 10 are coupled to pins 32 in a known manner.

When forward portion 14*a-c* of connector 10 is inserted into aperture 33 in the manner previously described, the bosses 16 of connector 10 deform the adjacent sidewalls of aperture 33 and the forward portion sidewalls carrying bosses 16. Upon reformation of the aperture and forward portion sidewalls, the connector 10 is locked in place.

Figure 5:
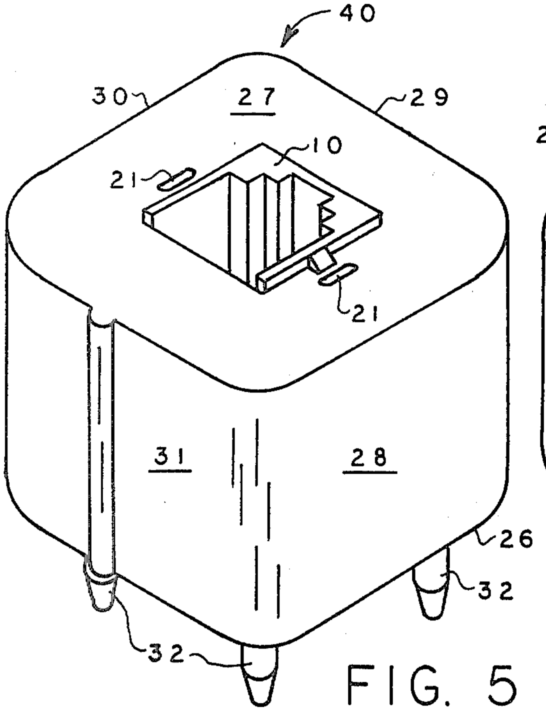
FIG. 5 is a perspective view of an alternative adapter assembly generally similar to that of FIG. 4.

The adapter-connector 40 of FIG. 5 is similar to the adapter-connector 25 of FIG. 4 excepting for the sidewall location of the modulator connector 10. The unit 40 also includes a plurality of pins 32, a rear wall 26, a front wall 27, and sidewalls 28, 29, 30, and 31. The adapter-connector 25 of FIG. 4 has the modular connector 10 disposed in one of its sidewalls while the adapter-connector 40 of FIG. 5 has the modular connector 10 disposed in an aperture of front wall 27. In all other respects, the adapter connectors may be identical. For example, the contacts 13 of connector 10 are coupled to pins 32 and the connector 10 is adapted to receive the mating connector in the manner previously described.

Figure 6:
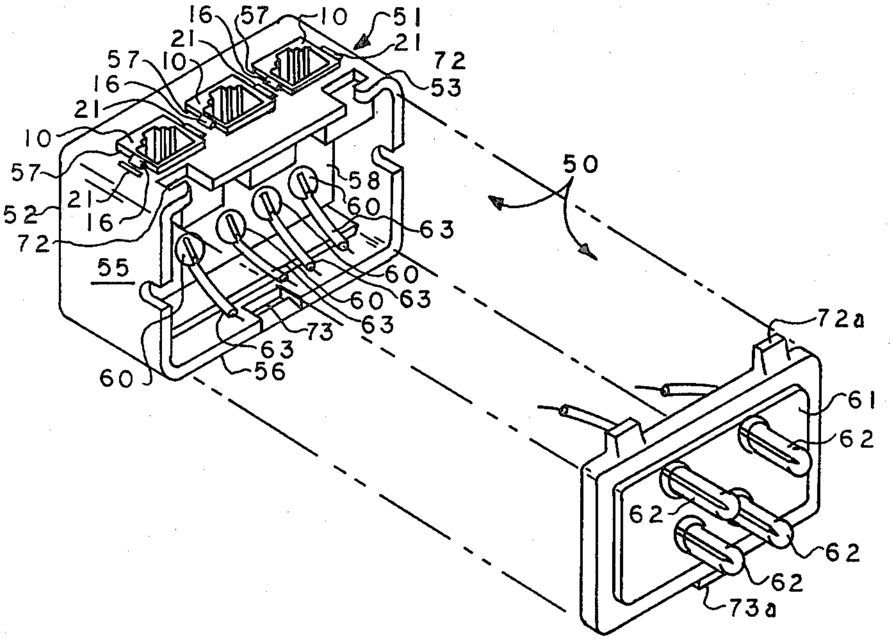
FIG. 6 is a perspective exploded view of an adapter assembly including three modular connectors and embodying further aspects of the present invention.

Referring to FIG. 6, an adapter-connector 50 is shown which is capable of connecting a plurality of modular telephone cables each having on one end a mating connector having a plurality of contacts to a telephone wall jack (not shown). The wall jack is of the conventional type which includes a plurality of female contacts coupled to telephone signal equipment. The adapter-connector 50 includes a partial enclosure 51 which comprises a front wall 52, and sidewalls 53, 54, 55, and 56. Sidewall 54 includes a first plurality of apertures 57 and associated relief slots 21 which are dimensioned for resiliently receiving the forward portions of connectors 10 in the manner previously described. Within the partial enclosure is a terminal strip 58 which includes a plurality of conductor connection terminals 60. In actual practice, terminal strip 58 will include six or eight conductor terminals, only four of which are shown in the Figure for convenience of illustration. The conductor terminals 60 are coupled to the contacts (FIGS. 1-3) of the connectors 10 in a known manner.

The connectors 10 are of the type previously described in relation to FIGS. 1 through 3 and include bosses 16 and shoulder portions for coacting with the apertures 57 for snaplocking the connectors.

The partial enclosure 51 also includes means for securely receiving a back wall panel 61 which has pins 62 arranged to be received by the female contacts of a telephone wall jack. The pins 62 are coupled to terminals 60 by conductors 63. As a result, when pins 62 are received by the female contacts of the wall jack, which are coupled to the telephone signal equipment, the telephone signal equipment is thereby connected to the contacts 13 of the female connectors 10. The modular telephone cables are readily connected to the telephone signal equipment when the mating connectors at one end of the cables are inserted into the connectors 10 in the previously described manner.

Figure 7:
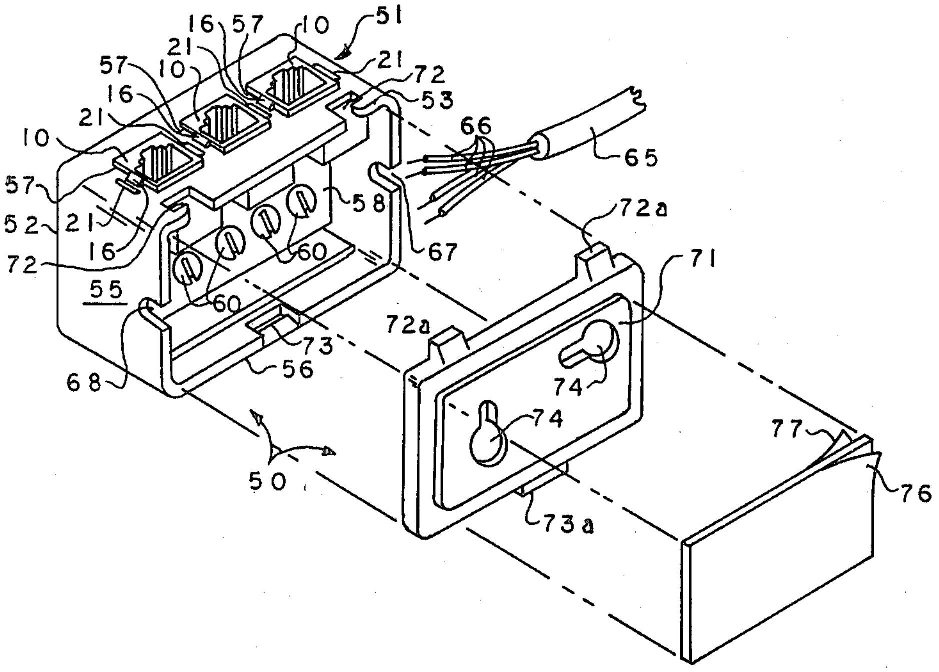
FIG. 7 is a perspective exploded view of still another embodiment of the present invention.

FIG. 7 shows the adapter-connector 50 of FIG. 6 in an environment in which the individual conductors 66 of a cable 65 are connected to the terminals 60 of a terminal strip 58. Sidewalls 53 and 55 include notched portions 67 and 68 respectively dimensioned to receive cable 65 so that the cable 65 can gain access to the interior of partial enclosure 51. The other ends of the conductors 66 of cable 65 are coupled to telephone signal equipment (not shown). By virtue of the fact that the contacts 13 of female connectors 10 are also coupled to terminals 60, the standardized or modular cables from individual telephone instruments are coupled to the telephone signal equipment by merely inserting the mating connectors into the connectors 10 in the previously described manner.

The partial enclosure 51 as previously mentioned includes means for securely receiving either the back panel 61 of FIG. 6 or the back panel 71 of FIG. 7. To this end, the partial enclosure 52 includes flange windows 72 and latch window 73. The back walls in a complementary manner include flanges 72*a* and 73*a*. When the back panels are to be secured to the partial enclosure, the flanges 72*a* and inserted into the window 72 and the flange 73*a* is press-fitted into the latch window 73.

As previously explained, back panel 61 has pins 62 which are arranged to mate with corresponding female contacts of a telephone wall jack. Back panel 71 of FIG. 7 does not include those pins inasmuch as connection is made to the telephone signal equipment via cable 65. Back panel 71 includes key slots 74 which may be utilized for securing the adapter-connector 50 of FIG. 7 to a wall or other vertical support member. Such a support would necessarily include a pair of screws or similar means to be inserted within key slots 74 for the purpose of securing the adapter-connector to the wall. Should it be desired not to mount the adapter-connector to a wall using the screws, an additional panel 76 having a double back adhesive coating 77 may be adhered to back panel 71 and the connector can be fastened to a wall by the exposed adhesive coating.

In utilizing the adapter connector of FIGS. 6 and 7, a telephone installer need only select the proper back panel as required and may utilize the same pre-wired adapter partial enclosure for either application.

Figure 8:
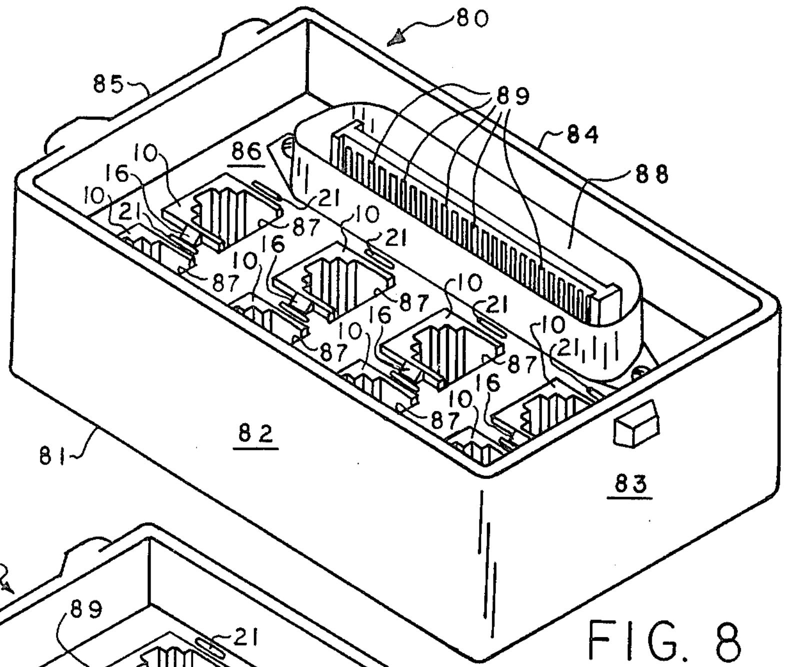
FIG. 8 is a perspective view of an adapter bridge connector embodying the present invention.

Referring now to FIG. 8, a bridge connector assembly 80 is shown which may be utilized for connecting selected conductors of a first multi-conductor telephone system cable to selected conductors of one or more second standardized modular cables associated with individual telephone instruments. The adapter bridge connector 80 of FIG. 8 includes a housing having a floor 81 and sidewalls 82, 83, 84, and 85, and a support 86 within the housing which extends between the sidewalls and substantially parallel to the floor. The support 86 may be secured to the sidewalls in any well known manner and includes a plurality of apertures 87 which receive the connectors 10 of FIGS. 1-3 in a manner as previously described. Suffice it to say here that the connectors 10 include bosses 16 and shoulder portion 15 (FIGS. 1-3) which lock the connectors 10 in place within the apertures. Relief slots 21 are also provided to assist in the insertion of the connectors as previously explained.

The bridge connector assembly 80 of FIG. 8 includes multiple contact connector 88 for establishing contact with the multi-conductor cable. This connector, which may comprise a Series 57 Amphenol connector includes a plurality of contacts 89 adapted to be coupled to respective ones of the conductors of the multi-conductor cable. Each of the connectors 10 includes a lesser number of contacts, and selected conductors of the standardized multi-conductor cables may be connected to selected conductors of the multi-conductor equipment cable.

The apertures 87 are arranged in side-by-side rows and between the apertures and sidewall 84 is the multiple contact connector 88. The conductors of the first multi-conductor cable may be coupled to a mating half of the Series 57 Amphenol connector 88 to adapt the contacts 89 for connection to the conductors of the telephone equipment cable.

The contacts 13 (FIGS. 1-3) of connectors 10 may be connected to the contacts 89 of connector 88 by conductors beneath support 86 in any well known manner.

As a result, selected contacts of connectors 10 are connected to selected ones of the conductors of the multi-conductor equipment cable, and a plurality of modular telephone cables may be selectively coupled to the telephone signal equipment by merely plugging the mating connectors at their end into the connectors 10.

Figure 9:
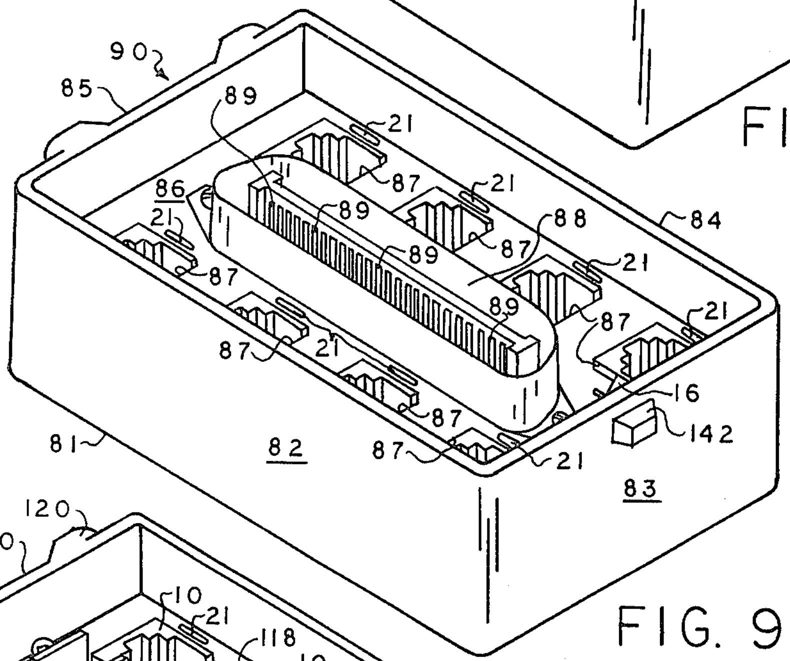
FIG. 9 is a perspective view of an another adapter bridge connector embodying the present invention.

The embodiment of FIG. 9 is similar to the adapter bridge connector of FIG. 8 except that the apertures 87 are arranged in spaced-apart rows with the multiple contact connector 88 disposed between the rows of openings. To that end, it includes sidewalls 82, 83, 84, and 85, and support 86 which extend between the sidewalls and parallel to floor 81.

Figure 11:
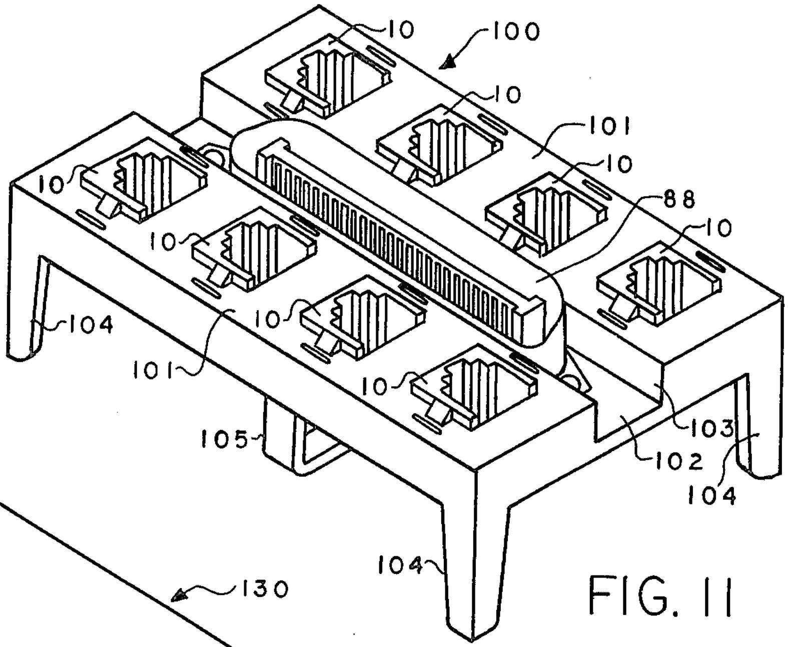
FIG. 11 is a perspective view of a support structure which may be utilized in practicing the embodiment of FIG. 9.

An alternate form of the support is shown in FIG. 11. The support 100 there shown includes a support surface 101 for receiving the connectors 10 (FIGS. 1 through 3) and a recessed portion 103 which includes a support surface 102 for receiving the multiple contact connector 88. The support 100 includes a plurality of legs 104 which are of substantially equal length and which communicate with the floor 81 of connector 90 so that the support surfaces 101 and 102 are parallel to the floor 81. A rigidity cross support 105 is provided to insure rigidity of the structure.

Figure 10:
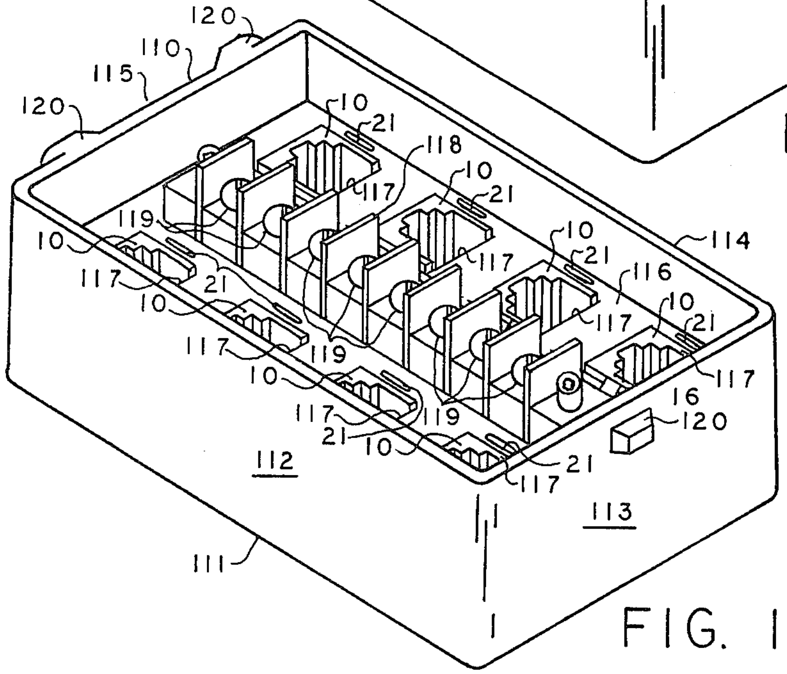
FIG. 10 is a perspective view of an adapter bridge connector showing a still further embodiment of the present invention.

Referring now to FIG. 10, the adapter bridge connector 110 there shown includes a housing having a floor 111, sidewalls 112, 113, 114, and 115, and a support 116 which extend between the sidewalls and parallel to floor 111. As in the embodiment of FIg. 9, support 116 has a plurality of apertures 117 arranged in spaced-apart rows and adjacent relief slots 21. In between the rows of openings is a barrier strip 118 which includes a plurality of terminals 119 which are adapted for connection to the conductors of a multiple conductor telephone cable (not shown).

The apertures 117 are dimensioned for receiving the connectors 10 of FIGS. 1 through 3 and the connectors 10 are locked in place in the previously described manner. As in the previous embodiments, the connectors 10 include bosses and shoulders for locking the connectors in place within the apertures 117. The contacts 13 (FIGS. 1 through 3) of connectors 10 are coupled to the terminals of barrier strip 118 beneath the support 116 in a known manner. The barrier 118 includes a plurality of eight terminals 119 and is thereby adapted to receive eight conductors connected to the telephone cable equipment via a multi-conductor telephone cable. Thus, each of the connectors may be coupled to a plurality of telephone lines.

The adapter 110 includes flanges 120 which cooperate with complementary locking openings of a cover (not shown) for the housing. The cover includes an opening for receiving the multi-conductor cable so that access to barrier strip 118 may be provided to the telephone cable. The same opening or additional openings within the cover allow the telephone cables extending from the male connectors received by the female connectors 10 access externally of the adapter bridge connector. With the conductors of the telephone cable being coupled to the barrier strip terminals and with the barrier strip terminals being coupled to the female connector contacts, when the male connectors of modular telephone cables are inserted into the female connectors, the telephone instruments at the other end of the modular telephone cables will thereby be connected to the telephone lines.

Figure 12:
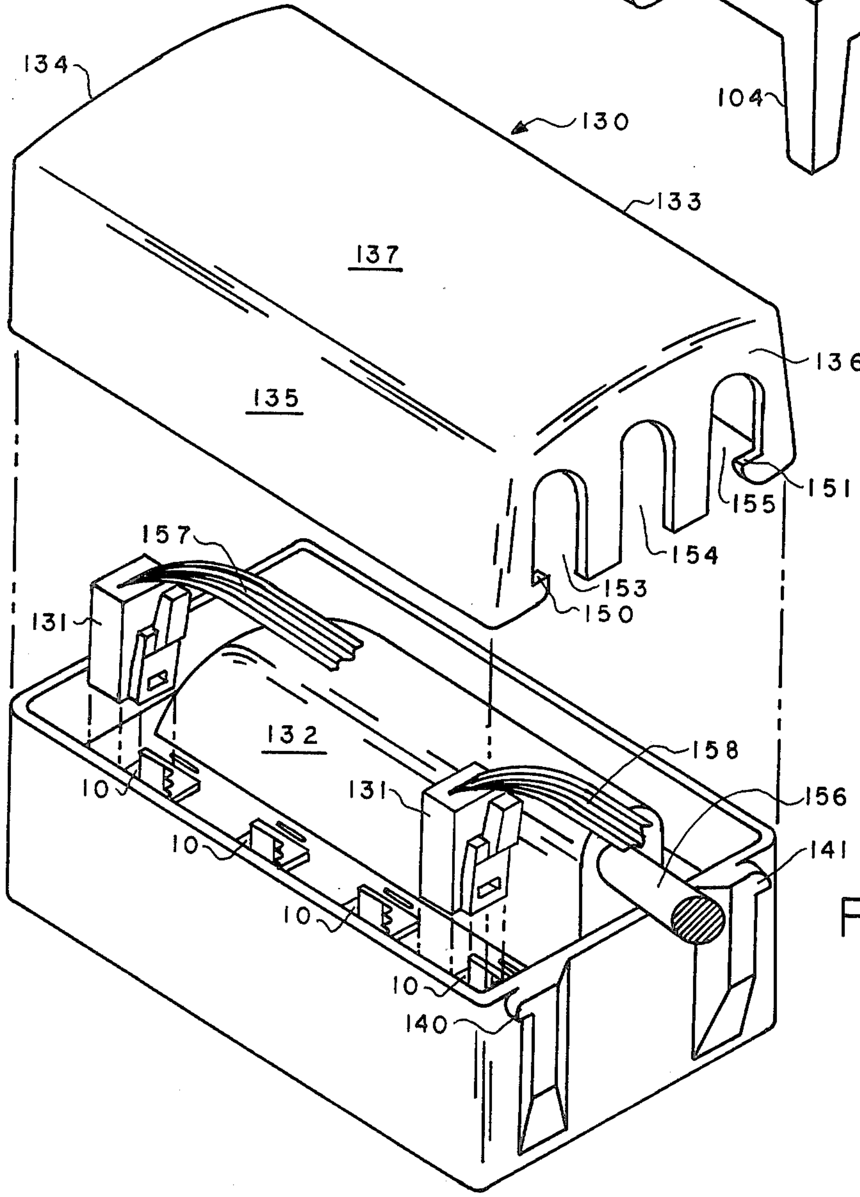
FIG. 12 is an exploded perspective view of the embodiment of FIG. 9 showing the adapter bridge connector in relation to its corresponding cover.

Referring now to FIG. 12, the adapter connector embodiment of FIG. 9 is shown in association with a top cover 130, a plurality of mating connectors 131, and a Series 57 Amphenol connector 132.

The cover 130 includes a plurality of sidewalls 133, 134, 135, and 136, and a top 137. The walls 133–136 are arranged for overlapping engagement with the adapter-connector enclosure. The enclosure includes locking flanges 140, 141, and 142 (FIG. 9) which are arranged to communicate in locking engagement with locking flanges 150 and 151 respectively and a third flange carried on wall 134 (not shown). The cover 130 and enclosure are preferably formed from plastic which renders flanges 150 and 151 resilient.

Wall 136 also includes a plurality of openings 153, 154, and 155 to afford the multi-conductor telephone signal equipment cable 156 and the modular cables 157 and 158 access to the inside of the enclosure. Although three such openings are shown, it will be appreciated that one or two large openings could also be employed.

The conductors of the multi-conductor telephone signal equipment cable 156 are coupled to respective ones of the contacts of connector 132, which are adapted to mate with the contacts 89 of connector 88 (FIG. 9). Since the contacts of connector 88 are connected to selected contacts 13 of connector 10, and the conductors of modular cables 157 and 158 are coupled to the contacts of mating connectors 131, when the mating connectors 131 are mated with the connectors 10, the modular cables 157 and 158 are coupled to the system equipment. Because there are many more contacts in connector 88 than in any one connector 10, a plurality of modular cables associated with a like plurality of telephone instruments may be connected to the signal equipment.

While particular embodiments of the present invention have been shown and described, modifications may be made, and it is intended in the appended claims to cover all such modifications that fall within the true spirit of the invention.

We claim:

1. An adapter connector assembly for connecting a plurality of modular telephone cables each having on one end a first connector having a plurality of contacts, to a plurality of conductors electrically coupled to telephone signal equipment, said assembly comprising:

- a partial enclosure defined by a plurality of walls, one of said walls including a first plurality of apertures each being defined by at least one sidewall and relief slot means adjacent said aperture sidewall;
- a terminal strip disposed within said partial enclosure including a plurality of conductor connection terminals;
- a like first plurality of second connectors each having a cavity for receiving one of said first connectors, a plurality of contacts electrically connected to selected ones of said terminals of said terminal strip and extending within said cavity whereby when the first connectors mate with the second connectors, respective ones of the first connector contacts engage respective ones of the second connector contacts, each said second connector also including at least one sidewall defining a forward portion having outside dimensions substantially corresponding to the dimensions of said apertures, an outwardly projecting shoulder portion for limiting the insertion of said forward portions in said apertures, a boss projecting outwardly from said second connector sidewalls and being axially forwardly spaced relative to said shoulder portions, and at least one of said sidewalls being inwardly deformable, whereby when said forward portions are inserted into said apertures, said bosses deform said deformable sidewalls to permit locking engagement of said bosses and said shoulder portions with said apertures;

said partial enclosure including means for securely receiving a back wall; and said partial enclosure including means for electrically connecting said plurality of conductors to said terminals of said terminal strip, said back wall including means for mounting said enclosure to a support surface.

2. An adapter connector assembly as defined in claim 1 wherein each said second connector includes a pair of opposite sidewalls and a boss having a ramped surface projecting from each said second connector sidewall.

3. An adapter connector assembly in accordance with claim 2 wherein said relief slot means comprises a pair of slots adjacent each said aperture and wherein a respective one of said slots is also adjacent a respective given one of said bosses.

4. An adapter connector assembly in accordance with claim 1 wherein said partial enclosure includes a pair of flange windows and a latch window for securely holding said back wall thereto, and wherein said back wall includes a complementary flanges for communicating with said flange windows and said latch window.

5. An adapter connector assembly as defined in claim 1, wherein said means for electrically connecting said plurality of conductors to said terminals comprises a plurality of pins electrically connected to said terminals and projecting from said back wall, said pins being engageable with a like plurality of female contacts disposed in a telepone wall jack and coupled to said plurality of conductors, said support surface comprising the surface of said wall jack and said means for mounting said enclosure to said support surface comprising said pins.

6. An adapter connector assembly as defined in claim 1, wherein said means for electrically connecting said plurality of conductors to said terminals comprises means for receiving said plurality of conductors in said enclosure for connection to said terminals, said terminals being adapted to connect to the conductors.

7. An adapter connector assembly for connecting at least one first multi-conductor cable each having on one end a first modular connector component having a plurality of contacts, to a plurality of conductors electrically coupled to telephone signal equipment, said assembly comprising:

an enclosure defined by a plurality of wall members, at least one of said wall members comprising a support member having at least one aperture therein; at least one second modular connector component each disposed within one said aperture, each said second connector component including a cavity for receiving one said first connector component and a plurality of contacts extending into said cavity whereby when each said first connector component mates with one said second connector component, respective ones of the first connector contacts engage respective ones of the second connector contacts;

means for electrically connecting said contacts of each said second connector component to selected ones of said plurality of conductors coupled to said telephone signal equipment; and means for mounting said enclosure to a support surface.

8. An adapter connector assembly for connecting at least one modular telephone cable, each having on one end a first connector having a plurality of contacts, to a plurality of conductors electrically coupled to telephone signal equipment, said assembly comprising:

a plurality of wall members forming at least a partial enclosure, one of said wall members comprising a support member having at least one aperture therein, each said aperture being defined by at least one sidewall with relief slot means being disposed adjacent thereto in said support member;

at least one second connector each including a cavity for receiving one of said first connectors and a plurality of contacts extending into said cavity, whereby when each first connector mates with one each second connector, respective ones of the first connector contacts engage respective ones of the second connector contacts, each said second connector also including at least one sidewall defining a forward portion having outside dimensions substantially corresponding to the dimensions of one said aperture, an outwardly projecting shoulder portion for limiting the insertion of each said forward portion in one said aperture, a boss projecting outwardly from at least one said second connector sidewall and being axially forwardly spaced relative to said shoulder portion, and at least one of said sidewalls being inwardly deformable, whereby when each said forward portion is inserted into one said aperture, said boss deforms said deformable sidewall to permit locking engagement of said boss and shoulder portions with said apertures;

means for electrically connecting said contacts of each said second connector to selected ones of said plurality of conductors coupled to said telephone signal equipment; and means for mounting said partial enclosure to a support surface.

9. An electrical connector assembly comprising:

a support member including at least one aperture, each said aperture being defined by at least a first pair of oppositely facing deformable sidewalls;

at least one connector each including a housing defining a cavity for receiving a mating electrical connector and having a second pair of oppositely facing deformable sidewalls defining a forward portion, each said connector having an outside dimension substantially corresponding to the dimension of one said aperture; and locking means carried by each said connector for deforming at least one of said deformable sidewalls upon insertion of said forward portion into said aperture and for locking said connector in place within one said aperture upon reformation of said deformable sidewall, said locking means including a shoulder portion projecting outwardly from said housing of said one connector over the edge of said aperture for limiting the insertion of said forward portion in said aperture and a boss projecting outwardly from each said connector sidewall of said second pair and forwardly axially spaced relative to said shoulder portion.

10. A connector assembly as defined in claim 9 further including a relief slot extending alongside each said aperture deformable sidewall.

11. A connector assembly as described in claim 10, wherein said planar side wall comprises one of a plurality of wall members forming an enclosure, said assembly comprising an adapter connector assembly for electrically connecting at least one modular telephone cable each having on one end one said mating electrical connector to a plurality of conductors electrically connected to telephone signal equipment.

12. A connector assembly as defined in claim 10 wherein said locking means comprises an outwardly projecting shoulder portion for limiting the insertion of said forward portion in said aperture and an outwardly projecting boss spaced forwardly and axially relative to said shoulder portion.

13. A connector assembly as defined in claim 12, wherein said connector sidewall is deformable and said boss includes a ramped surface for engaging one said aperture sidewall for gradually deforming said connector sidewall upon insertion of said forward portion in said aperture.

14. A connector assembly as defined in claim 12 wherein said boss includes a ramp surface or gradually deforming said aperture side wall upon insertion of said forward portion in said aperture.

15. A connector assembly as defined in claim 12 wherein said planar surface of said support member includes a front side and a rear side and wherein said boss engages said front side and said shoulder portion engages said rear side upon reformation of said deformable planar surface to thereby locked said connector in said aperture.

16. An adapter connector assembly for connecting at least one first multi-conductor cable each having on one end a first modular connector component having a plurality of contacts, to a plurality of conductors electrically coupled to telephone signal equipment, said assembly comprising:

an enclosure defined by a plurality of wall members, at least one of said wall members comprising a support member having at least one aperture therein;

at least one second modular connector component each disposed within one said aperture, each said second connector component including a cavity for receiving one said first connector component and a plurality of contacts extending into said cavity whereby when each said first connector component mates with one said second connector component, respective ones of the first connector contacts engage respective ones of the second connector contacts;

means for electrically connecting said contacts of each said second connector component to selected ones of said plurality of conductors coupled to said telephone signal equipment; and means for mounting said enclosure to a support surface, wherein each said aperture is defined by at least one sidewall with relief slot means being disposed adjacent thereto in said support member, and wherein each said second connector component includes at least one sidewall defining a forward portion having outside dimensions substantially corresponding to the dimensions of one said aperture, an outwardly projecting shoulder portion for limiting the insertion of each said forward portion in one said aperture, a boss projecting outwardly from at least one said second connector sidewall and being axially forwardly spaced relative to said shoulder portion, and at least one of said sidewalls being inwardly deformable, whereby when each said forward portion is inserted into one said aperture, said boss deforms said deformable sidewall to permit locking engagement of said boss and shoulder portions with said aperture.

17. A connector assembly as described in claim 16, wherein said plurality of conductors electrically coupled to telephone signal equipment are terminated in a plurality of female contacts of a telephone wall jack, and wherein said means for electrically connecting said contacts of each said second connector component to said plurality of conductors comprise a plurality of pins extending from one said wall member and electrically connected to said second connector component contacts, said pins being adapted for mating engagement with said female contacts.

18. A connector assembly as described in claim 17, wherein said assembly includes a plurality of said second modular connector components, and said mounting means comprises said pins, said support surface being the surface of said telephone wall jack.

19. A connector assembly as described in claim 16, wherein said means for electrically connecting said contacts of each said second connector component to said plurality of conductors comprise a terminal strip disposed within said enclosure and including a plurality of conductor connection terminals electrically connected to said plurality of conductors, and a second plurality of conductors electrically interconnecting said connection terminals and said contacts of each said second connector component, said enclosure including means for receiving said plurality of conductors electrically coupled to telephone signal equipment.

20. An adapter connector assembly for connecting at least one modular telephone cable each having on one end a first connector having a plurality of contacts to a telephone wall jack of the type which includes a plurality of female contacts connected to telephone signal equipment, said adapter connector assembly comprising:

an enclosure having a plurality of walls;

a plurality of pins extending from a first one of said walls and arranged for mating with the plurality of female contacts of the telephone wall jack;

at least one aperture disposed within a second one of said walls, each said aperture being defined by at least one sidewall;

relief slot means within said second one of said walls adjacent said aperture sidewall; and at least one second connector each including a cavity for receiving one said first connector and a plurality of contacts electrically connected to said plurality of pins and extending within said cavity, whereby when the first connector mates with said second connector, respective ones of the first connector contacts engage respective ones of the second connector contacts, each said second connector also including at least one sidewall defining a forward portion having outside dimensions substantially corresponding to the dimensions of one said aperture, an outwardly projecting shoulder portion for limiting the insertion of said forward portion in said aperutre, and a boss projecting outwardly from said second connector sidewall and being axially forwardly spaced relative to said shoulder portion, one said sidewall being deformable, whereby when said forward portion is inserted into said aperture, said boss deforms said deformable sidewall to permit locking engagement of said boss and said shoulder portion with said aperture.

21. An adapter connector assembly as defined in claim 20 wherein said enclosure includes a top wall and wherein said one said aperture is disposed within said top wall.

22. An adapter connector assembly as defined in claim 21 wherein said boss comprises a ramped surface.

23. An adapter connector assembly as defined in claim 22 wherein said forward portion comprises at least one pair of opposing sidewalls and wheren a boss extends from each said opposing sidewall of said forward portion.

24. An adapter connector assembly as defined in claim 23 wherein said relief slot means comprises a pair of slots within said top wall adjacent said aperture and said bosses.

25. An adapter connector assembly as defined in claim 20 wherein said enclosure includes a front wall and wherein one said aperture is disposed within said front wall.

26. An adapter connector assembly as defined in claim 25 wherein said boss comprises a ramped surface.

27. An adapter connector assembly as defined in claim 26 wherein said forward portion comprises at least one pair of opposing sidewalls and wherein a boss extends from each said opposing sidewall of said forward portion.

28. An adapter connector assembly as defined in claim 27 wherein said relief slot means comprises a pair of slots within said front wall adjacent said aperture and said bosses.

29. An electrical connector assembly comprising:

a support member including at least one planar sidewall, said planer sidewall defining at least one aperture therein and including at least one relief slot extending therethrough and being disposed immediately adjacent to the edge of said aperture;

at least one connector each including a housing defining a cavity for receiving a mating electrical connector and having at least one side wall defining a forward portion, each said connector having an outside dimension substantially corresponding to the dimension of one said aperture; and locking means carried by each said connector for deforming said planar side wall upon insertion of said forward portion into said aperture and for locking said connector in place within said aperture upon reformation of said planar side wall, said locking means deforming said planar side wall at a location approximate to said relief slot.

* * * * *